(12) United States Patent
Parisi

(10) Patent No.: US 12,138,581 B2
(45) Date of Patent: Nov. 12, 2024

(54) ZERO-LIQUID DISCHARGE AMINE RECLAMATION PROCESS FOR CARBON CAPTURE AND OTHER ACID GAS RECOVERY

(71) Applicant: ELECTROSEP INC., League City, TX (US)

(72) Inventor: Paul Parisi, League City, TX (US)

(73) Assignee: ELECTROSEP INC., League City, TX (US)

( * ) Notice: Subject to any disclaimer, the term of this patent is extended or adjusted under 35 U.S.C. 154(b) by 0 days.

(21) Appl. No.: 18/576,336

(22) PCT Filed: Jun. 23, 2023

(86) PCT No.: PCT/CA2023/050877
§ 371 (c)(1),
(2) Date: Jan. 3, 2024

(87) PCT Pub. No.: WO2023/245300
PCT Pub. Date: Dec. 28, 2023

(65) Prior Publication Data
US 2024/0261722 A1     Aug. 8, 2024

Related U.S. Application Data

(60) Provisional application No. 63/366,890, filed on Jun. 23, 2022.

(51) Int. Cl.
*B01D 53/14*     (2006.01)

(52) U.S. Cl.
CPC ..... *B01D 53/1425* (2013.01); *B01D 53/1412* (2013.01); *B01D 53/1418* (2013.01);
(Continued)

(58) Field of Classification Search
CPC ............ B01D 53/1425; B01D 53/1412; B01D 53/1418; B01D 53/1481; B01D 53/1493;
(Continued)

(56) References Cited

U.S. PATENT DOCUMENTS 3,554,690 A * 1/1971 Mayland et al. .. B01D 53/1456
423/229
5,292,407 A * 3/1994 Roy ....................... B01D 61/44
205/431

(Continued)

OTHER PUBLICATIONS

Lim, J., et al., "Techno-economic comparison of amine regression process with heat-stable amine salt reclaiming units", Energy Sci Eng. 2021; 9: pp. 2529-2543. Retrieved from the Internet on Jul. 18, 2023 (Jul. 18, 2023) at: https://doi.org/10.1002/ese3.1000.
WIPO, Canadian International Search Authority, International Search Report and Written Opinion mailed Sep. 7, 2023 in International Patent Application No. PCT/CA2023/050877, 6 pages.

*Primary Examiner* — Christopher P Jones
*Assistant Examiner* — Phillip Y Shao
(74) *Attorney, Agent, or Firm* — Inskeep IP Group, Inc.

(57) ABSTRACT

The proposed techniques relate to removing heat stable amine salts (HISAS) from a contaminated aqueous amine absorption solution containing amine in salt form generated during an amine-based acid gas recovery operation, while reducing or avoiding discharging any liquid waste. At least a portion of the HSAS is removed from the contaminated aqueous amine absorption solution in an amine reclamation unit to produce a waste stream containing dissolved salts and/or acids, and a regenerated amine absorption solution containing a reduced amount of the heat stable amine salts. The waste stream is further treated by oxidizing the waste stream into an oxidized product stream comprising $CO_2$, water, and nitrogen. Optionally, the concentration in dissolved salts and/or acids of the waste stream can be
(Continued)

increased prior to oxidation. The oxidation can advantageously be operated in a combustion unit that produces a flue gas directed to acid gas recovery as part of an integrated process.

20 Claims, 4 Drawing Sheets

(52) U.S. Cl.
CPC ..... *B01D 53/1481* (2013.01); *B01D 53/1493* (2013.01); *B01D 2256/10* (2013.01); *B01D 2256/22* (2013.01); *B01D 2257/302* (2013.01)

(58) Field of Classification Search
CPC ............ B01D 2256/10; B01D 2256/22; B01D 2257/302
See application file for complete search history.

(56) References Cited

U.S. PATENT DOCUMENTS

| | | | |
|---|---|---|---|
| 5,910,611 A * | 6/1999 | Gregory, Jr. ......... | B01D 53/526 564/497 |
| 6,517,700 B2 | 2/2003 | Byszewski | |
| 2007/0148068 A1* | 6/2007 | Burgers ............. | B01D 53/1425 423/220 |
| 2012/0235087 A1* | 9/2012 | Handagama ....... | B01D 53/1425 422/186.04 |
| 2013/0309155 A1* | 11/2013 | Parisi ................ | B01D 53/1425 252/190 |

\* cited by examiner

ZERO-LIQUID DISCHARGE AMINE RECLAMATION PROCESS FOR CARBON CAPTURE AND OTHER ACID GAS RECOVERY

RELATED APPLICATIONS

This application is the U.S. National Phase of and claims priority to International Patent Application No. PCT/CA2023/050877, International Filing Date Jun. 23, 2023, entitled Zero-Liquid Discharge Amine Reclamation Process For Carbon Capture And Other Acid Gas Recovery, which claims benefit of and priority to U.S. Provisional Application Ser. No. 63/366,890 filed Jun. 23, 2022 entitled Amine Reclamation Process Generating Net Zero Waste For Carbon Capture And Other Acid Gas Recovery; both of which are incorporated herein by reference in their entireties.

TECHNICAL FIELD

The present techniques relate to the removal of heat stable amine salts from liquid streams, and more particularly to the recovery of a waste stream for oxidation and recycling thereof in order to generate a net zero-liquid discharge.

BACKGROUND

A wide variety of absorption processes have been proposed for removing acid gases such as carbon dioxide, hydrogen sulphide and sulphur dioxide from process gas streams using absorbents comprising amines.

Such absorption processes typically involve passing the process gas stream containing one or more of the acid gases to an absorption zone wherein it is contacted with a lean solvent comprising the amine absorbent. A product gas stream, depleted in the acid gases relative to the process gas stream, is withdrawn from the absorption zone as a product. A rich solvent stream comprising the amine absorbent and the absorbed acid gases is also withdrawn from the absorption zone and passed to a regeneration zone, e.g., a stripping column, where the absorbed acid gases are desorbed from the solvent to provide a tail gas stream comprising the acid gases and the lean solvent stream herein before described.

A common problem in such acid gas absorption processes is that heat stable salts of the amine are often formed during one or both of the absorption and regeneration steps as a by-product. Heat stable salts of the amine can be formed, for example, when strong acids such as hydrochloric acid or sulphuric acid are present in the process gas.

Heat stable salts of the amine can also be formed when sulphite anions are oxidised to sulphate anions when removing $SO_2$ from the process gas according to an amine-based recovery process. Typical ions which form heat stable salts, i.e., heat stable anions, include, for example, sulphate anions, thiosulphate anions, polythionate anions, thiocyanate anions, acetate anions, formate anions, nitrate anions, chloride anions, oxalate ions and in addition for amines suitable for $H_2S$ and $CO_2$ scrubbing, sulphite anions. Heat stable salts generally do not have absorption capacity for the acid gases and are not regenerable under the conditions of the process. Therefore, the level of heat stable salts needs to be controlled to retain an adequate degree of absorption capacity for the acid gases. Removal of heat stable amine salts can be referred to as reclamation of the amine containing stream.

Electrodialysis has been proposed as a method for removing heat stable amine salts from amine containing streams. In a typical electrodialysis process, such as the one described in U.S. Pat. No. 5,910,611, a neutralizing cation, e.g. via sodium hydroxide, is added to the stream containing the heat stable salt of the amine in order to dissociate the heat stable anion (e.g., sulfate anion) from the heat stable salt and provide an amine in free base form (deprotonated) and a simple heat stable salt, e.g., sodium sulphate. The simple heat stable salt is then separated by conventional electrodialysis wherein the charged ions permeate through anion- and cation-selective membranes. The amine in free base form, which is non-ionic, does not permeate through the membranes and is discharged from the electrodialysis zone as a product. Often, conventional electrodialysis processes can operate in a batch mode where the process streams are recirculated until the desired amount of heat stable salts is removed.

Various methods including electrodialysis can be utilized to remove the salts, such as distillation, ion exchange and simply bleed and feed. In all cases a waste stream is generated that must subsequently be disposed of. For ion exchange and electrodialysis the waste stream is typically aqueous. Electrodialysis has the advantage of generating a lower volume aqueous waste stream. The stream contains the various acids that have been removed by the reclamation process and depending on the electrodialysis method and/or configuration used, the waste stream is composed of water, the dissolved salts and/or acids responsible for the formation of the heat stable salts, possibly cations that are used to neutralize said acids (e.g., sodium or potassium), some amine and possibly some other contaminants such as solids and trace hydrocarbons.

There is still a need for a technology that overcomes at least some of the drawbacks of what is known in the field, such as the above-mentioned drawbacks that may result from disposing/discharging the aqueous waste stream.

SUMMARY

In one aspect, there is provided a process for removing heat stable amine salts (HSAS) from a contaminated aqueous amine absorption solution containing amine in salt form generated during an amine-based acid gas recovery operation. The process includes:
  removing at least a portion of the HSAS from the contaminated aqueous amine absorption solution in an amine reclamation unit, thereby producing:
    a waste stream containing dissolved salts and/or acids, and
    a regenerated amine absorption solution containing a reduced amount of the heat stable amine salts; and
  treating the waste stream comprising oxidizing the waste stream into an oxidized product stream comprising $CO_2$, water, and nitrogen.

In some implementations, treating the waste stream further includes adjusting a salt and/or acid concentration in the waste stream prior to oxidation thereof. For example, the salt and/or acid concentration can be of at least 2 wt %, at least 5 wt %, at least 10 wt %, at least 20 wt %, at least 30 wt %, at least 40 wt %, or at least 50 wt %. For example, adjusting the salt and/or acid concentration in the waste stream can include concentrating the waste stream by removing at least a portion of the water from the waste stream to produce a concentrated stream. Optionally, concentrating the waste stream comprises evaporation, distillation, reverse osmosis, electrodialysis or any combinations thereof.

In some implementations, the process includes redirecting the at least a portion of the water removed via concentrating back to the amine reclamation unit or any other unit of the amine-based acid gas recovery operation and of an acid gas production operation.

In some implementations, adjusting the salt and/or acid concentration in the waste stream comprises controlling operation of the amine reclamation unit for a given salt and/or acid concentration of the produced waste stream.

In some implementations, oxidizing the waste stream comprises subjecting the waste stream to combustion to generate the oxidized product stream. For example, the combustion can be performed in a burner. Optionally, treating the waste stream can further include recycling at least a portion of the oxidized product stream to the amine-based acid gas recovery operation. In another example, the combustion can be performed in a combustion unit of an acid gas production operation to generate a feed gas of the amine-based acid gas recovery operation.

In some implementations, the process can further comprise recovering acid gases including the $CO_2$ from the oxidized product stream by supplying the oxidized product stream to an absorption unit of the amine-based acid gas recovery operation, wherein the oxidized product stream is contacted with an aqueous amine absorption solution for absorption of the acid gases.

In some implementations, when the oxidized product stream further comprises $SO_2$ and/or $SO_3$, the process can further include recovering acid gases from the oxidized product stream by:
  subjecting the oxidized product stream to gas conditioning in a scrubbing unit or a quenching unit, to remove $SO_2$ and/or $SO_3$, and produce a depleted oxidized product stream; and
  supplying the depleted oxidized product stream to at least one absorption unit of the amine-based acid gas recovery operation, wherein the depleted oxidized product stream is contacted with an aqueous amine absorption solution to recover at least $CO_2$.

For example, the process can include withdrawing a bleed stream from the gas conditioning step and supplying at least a portion of the bleed stream to the amine reclamation unit to participate in generating the waste stream. Optionally, the process can include combining another portion of the bleed stream with the waste stream before oxidizing thereof.

In some implementations, the oxidizing of the waste stream can include supplying the waste stream to a wastewater treatment unit operating oxidation of the salts and/or acids via contact with an oxidation agent to produce the oxidized product stream.

In some implementations, the process can include releasing the oxidized product stream to the atmosphere.

In some implementations, the contaminated aqueous amine absorption solution fed to the amine reclamation unit is a slipstream of a regenerated absorption solution produced during the amine-based acid gas recovery operation. The slipstream can be supplied to the amine reclamation unit continuously, semi-continuously or in batch.

In another aspect, there is provided herein an integrated amine reclamation process for recovering heat stable amine salts including recycling the recovered dissolved salts and/or acids to an initial combustion step and combusting the salts to regenerate acid gas products, converting the acid gas recovery into a net zero waste process. Upon combustion, the waste heat stable amine salts are converted to water, $CO_2$ and possibly nitrogen. For example, the generated $CO_2$ can thus for the most part be captured and become a product of the overall process resulting in an overall net zero discharge facility or process.

In some implementations, the process can further include at least one feature as defined herein.

In yet another aspect, an integrated process is provided and comprises:
  combusting a fuel to generate a combustion gas stream comprising at least one of $CO_2$, $H_2S$, $SO_2$ and $SO_3$;
  when $SO_2$ and/or $SO_3$ are present in the combustion gas stream, optionally conditioning the combustion gas stream by supplying the combustion gas stream in a quenching unit or scrubbing unit to remove at least a portion of at least one of $SO_2$ and $SO_3$ from the combustion gas stream and produce a conditioned feed gas stream;
  absorbing at least one of $CO_2$, $SO_2$ and $H_2S$ from conditioned feed gas stream by contacting the conditioned feed gas stream with an amine-based absorption solution to produce an enriched absorption solution and a depleted product gas stream;
  desorbing at least one of the $CO_2$, $SO_2$ and $H_2S$ from the enriched absorption solution to produce an acid gas stream and a depleted absorption solution comprising heat stable amine salts;
  supplying a slipstream (at least a portion) of the depleted absorption solution to an amine reclamation unit to remove at least a portion of the heat stable amine salts from the slipstream, thereby producing a waste stream comprising dissolved salts and/or acids, and a regenerated amine absorption solution comprising a reduced amount of the heat stable amine salts;
  concentrating the waste stream to increase a dissolved salt and/or acid concentration thereof, for example by removing at least a portion of the water from the waste stream, to produce a concentrated stream; and
  combusting the concentrated stream along with the fuel to participate in generating the combustion gas stream.

In some implementations, a bleed stream can be further withdrawn from the quenching unit or scrubbing unit during conditioning, and the process further comprises redirecting at least a portion of the bleed stream to the amine reclamation unit for removal of heat stable salts. Optionally, another portion of the bleed stream can be redirected to the concentrating step for removal of water along with the waste stream, thereby participating in generating the concentrated stream.

In some implementations, a bleed stream can be further withdrawn from the quenching unit or scrubbing unit during conditioning, and the process further comprises redirecting at least a portion of the bleed stream to the concentrating step for removal of water along with the waste stream, thereby participating in generating the concentrated stream.

In some implementations, the process can include recovering excess water from the amine reclamation unit or the concentrating step and redirecting the excess water to the conditioning step in the quenching unit or the scrubbing unit.

In some implementations, the process can further include at least one feature as defined herein.

In another aspect, there is provided a system for removing heat stable amine salts from a contaminated aqueous amine absorption solution generated during amine-based recovery of an acid gas representing at least a portion of a flue gas produced by combusting fuel and an oxidant. The system includes:
  an amine reclamation unit configured to receive a slipstream comprising the heat stable amine salts from a regeneration unit of the amine-based acid gas recovery and to produce:

a reclaimed stream depleted in heat stable salts for supply to an absorption unit of the amine-based acid gas recovery, and a waste stream comprising dissolved salts and/or acids;

a concentration unit configured to receive the waste stream and produce a concentrated waste stream having an increased dissolved salt and/or acid concentration with respect to the waste stream; and an oxidizing unit having an inlet in fluid communication with the concentration unit and configured to supply the concentrated waste stream to the oxidizing unit for oxidation thereof to produce an oxidized product stream.

In some implementations, the system further comprises, upstream of the amine reclamation unit, an acid gas recovery assembly comprising the absorption unit for contacting the combustion gas with an absorption solution for absorbing the at least one acid gas and the desorption unit for producing the reclaimed stream depleted in heat stable salts. For example, the absorption solution is an amine-based absorption solution.

For example, the system can further comprise at least one additional absorption unit, a scrubbing unit, a quenching unit or a combination thereof, being located upstream of the absorption unit to remove at least a portion of the acid gases other than $CO_2$ from the flue gas. Optionally, when the acid gas recovery assembly comprises the at least one additional absorption unit and the system further comprises, for each additional absorption unit, an additional regeneration unit, an additional amine reclamation unit and an additional concentration unit, being operated in parallel to the respective regeneration unit, amine reclamation unit and concentration unit.

In some implementations, the oxidizing unit can be a combustion unit having the inlet in fluid communication with the concentration unit for receiving the concentrated waste stream. For example, the combustion unit can be a burner. Optionally, the combustion unit can further has an outlet in fluid communication with at least one unit of the amine-based acid gas recovery to treat the oxidized product stream along with the flue gas. In another example, the combustion unit further has a fuel inlet configured to receive the fuel and an oxidant inlet configured to receive the oxidant, and the oxidized product stream is the flue gas that is directed to the amine-based acid gas recovery.

In some implementations, the system further comprises a control unit being operatively connected to at least one of the amine reclamation unit and the concentration unit to control the water content of the waste stream and/or the concentration of dissolved salts/acids in the waste stream.

While the invention will be described in conjunction with example embodiments and implementations, it will be understood that it is not intended to limit the scope of the invention to such embodiments or implementations. On the contrary, it is intended to cover all alternatives, modifications and equivalents as may be included as defined by the present description. The objects, advantages and other features of the present invention will become more apparent and be better understood upon reading of the following non-restrictive description of the invention, given with reference to the accompanying drawings.

DETAILED DESCRIPTION

The present techniques relate to an amine reclamation process facilitating disposal of heat stable amine salts generated in upstream amine-based acid gas absorption and desorption stages. The reclamation process includes recovery of the heat stable amine salts and redirection of the recovered heat stable amine salts to an oxidizing step to destroy the heat stable amine salts. For example, the oxidizing step can be a combustion step, and such combustion step can advantageously be integrated to the process for generating the combustion gas that is further treated in the amine-based acid gas absorption and desorption stages, thereby converting the overall process into a net zero-liquid discharge process.

Figure 2:
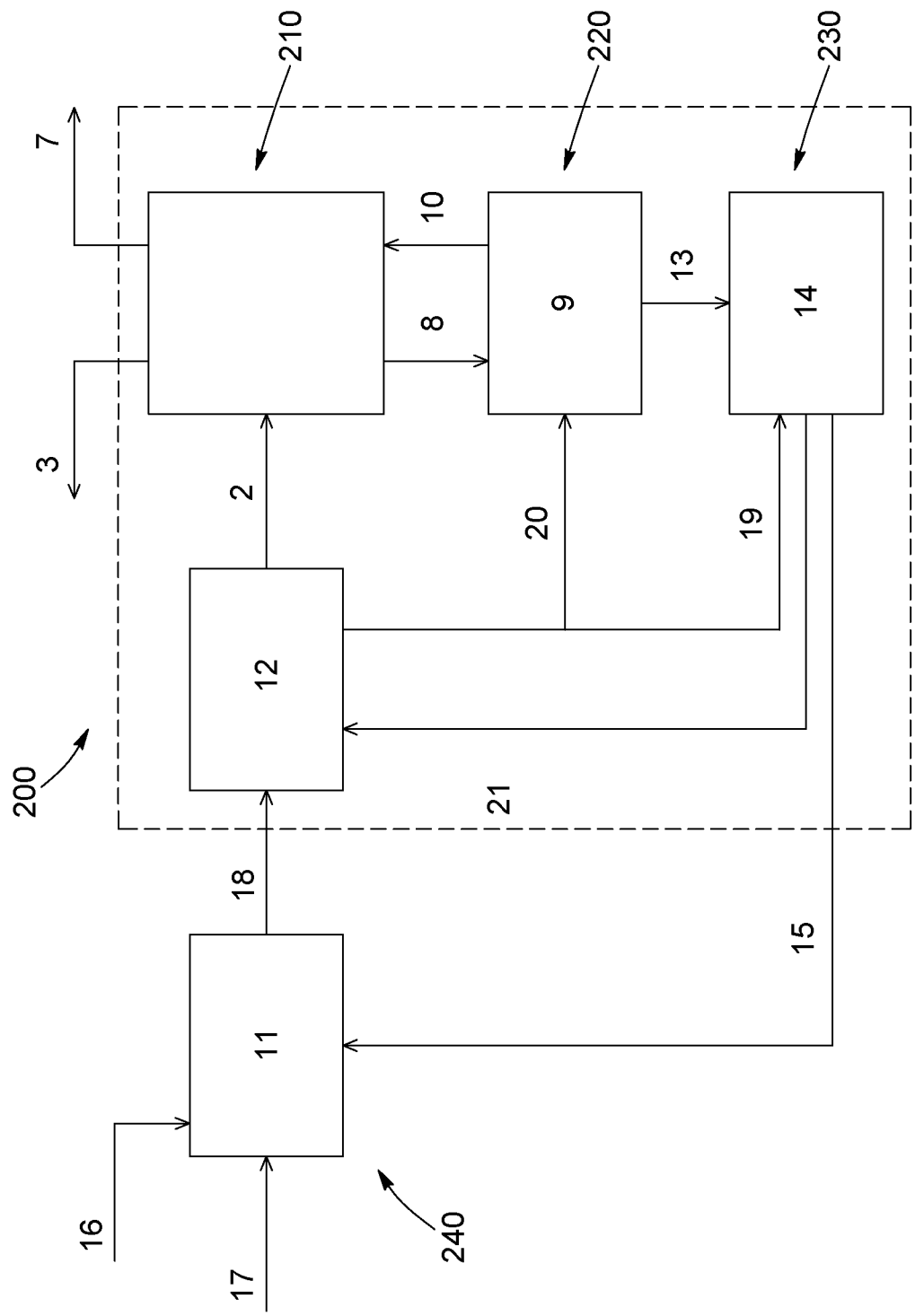
FIG. 2 illustrates a process flow diagram including integration of an acid gas production operation via combustion, an amine-based acid gas recovery operation (such as carbon capture) whereby heat stable amine salts are produced, and an amine reclamation operation comprising recovery of the heat stable amine salts and redirection thereof to the combustion stage for destruction.

Heat stable amine salts (HSAS) can be formed during absorption of acid gases from a feed gas by an amine-based absorption solution and during desorption of the acid gases from an enriched absorption solution. For example, the feed gas can include hydrogen sulphide, carbon dioxide, sulfur oxides, or any combinations thereof. For example, the feed gas can be produced by a combustion step as represented in FIG. 2.

Figure 1:
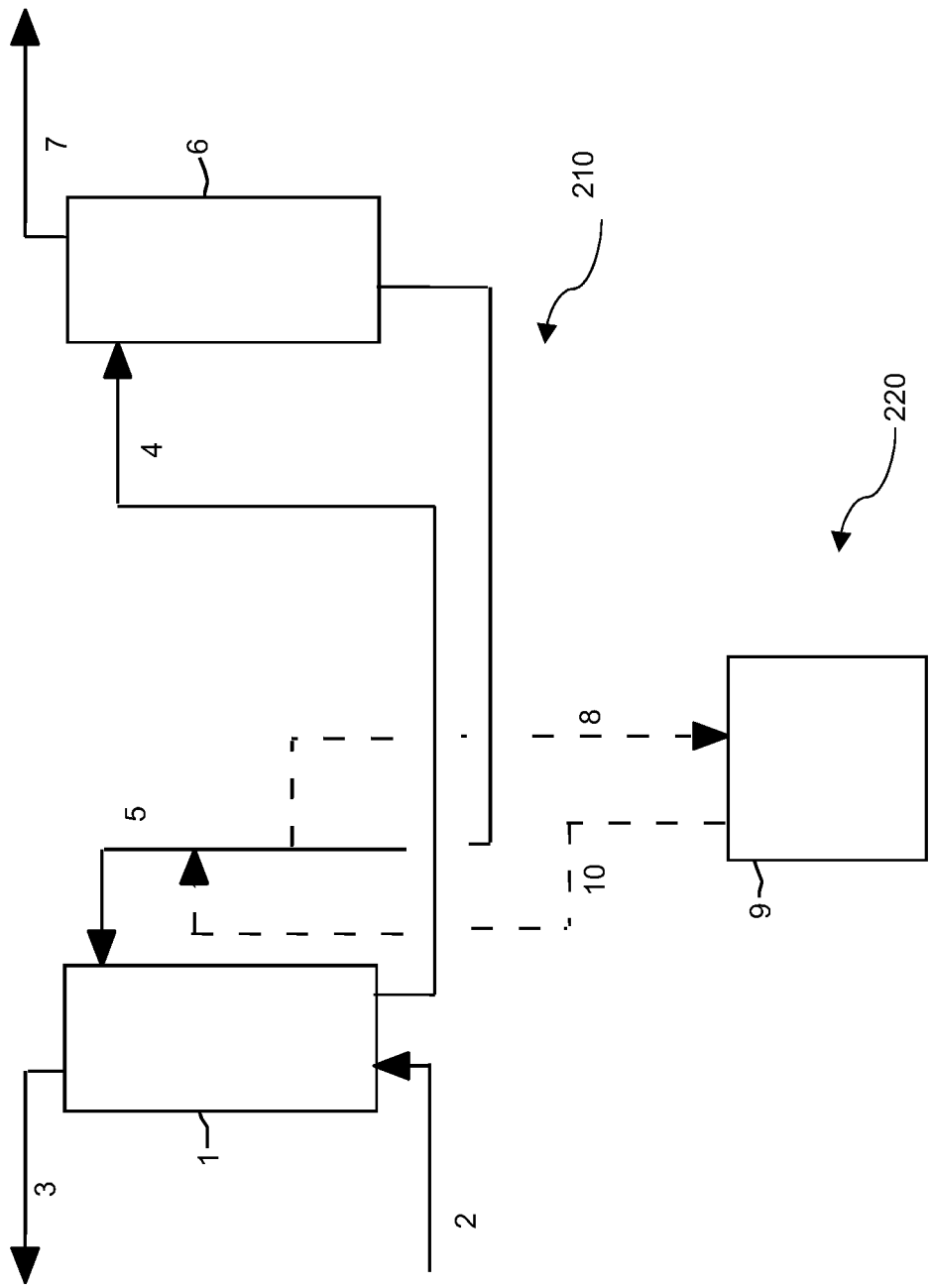
FIG. 1 illustrates a process flow diagram in which an electrodialysis unit is utilized as an amine reclamation unit to remove heat stable salts produced during an amine-based acid gas recovery operation.

Referring to FIG. 1, the feed gas 2 can include carbon dioxide and a balance comprising water vapor and nitrogen. The balance can include other combustion products such as methane and ethane. The feed gas is introduced via line 2 into the absorption zone 1 where the feed gas is contacted with a lean amine-based absorption solution via line 5. The lean amine-base absorption solution comprises an amine or a mixture of amines, with the balance being mostly water. The lean amine-based absorption solution can for example comprise diethanolamine or methyl diethanolamine, mixtures or blends of amines and possibly physical solvents. The absorption zone 1 is maintained at an absorption temperature between 20° C. and 60° C., and an absorption pressure between 1 atm and 150 atm. The absorption zone 1 can be part of a packed tower, a spray scrubber or any other types of absorption apparatus as readily available in the field. During absorption of carbon dioxide (and other acid gases) from the feed gas in the absorption zone 1, HSAS can be formed. HSAS result from the reaction of the amine with acids that are stronger than carbonic acid. These acids can, for example, include chlorides, organic acids, oxalates, cyanides, thiocyanides, thiosulphates, any analogs thereof, or any combinations thereof.

In some implementations, the amine can be, for example an aliphatic amine or amide, an aromatic amine and amide, a heterocyclic amine or amide, or any combinations thereof. For example, aliphatic amines can include alkanolamines, alkyleneamines or any combinations thereof. For example, alkanolamines can include monoethanolamine, diethanolamine, triethanolamine and methyldiethanolamine. For example, alkyleneamines can include ethylene diamine and alkyl derivatives thereof. For example aromatic amines can include aniline and xylidine. For example, heterocyclic amines can include piperazine and derivatives thereof. For example, amides can include piperazinone and derivatives thereof.

Still referring to FIG. 1, a product gas stream being at least partially depleted in carbon dioxide relative to the feed gas stream is discharged from the absorption zone 1 via line 3. An enriched absorption solution comprising absorbed carbon dioxide, the amine and any formed HSAS are discharged from the absorption zone 1 via line 4 and passed to a desorption zone 6 (that can also be referred to as a regeneration zone). During regeneration, carbon dioxide is liberated from the enriched absorption solution in a regeneration overhead stream further comprising water and being discharged from the regeneration zone 6 via line 7. Desorption further leads to the formation of an acid-gas depleted absorption solution that can be further cooled and used as a regenerated amine-based absorption solution via line 5. For example, the desorption zone 6 can be a distillation column operated under steam stripping conditions at a desorption temperature between 75° C. and 150° C. and a desorption pressure between 1 atm and 5 atm(a).

Although acid gases such as $CO_2$ can be liberated via desorption, HSAS are thermally-unregenerable and cannot be regenerated as acids in typical regeneration conditions via desorption. It is also common for HSAS to further form in the regeneration zone as well (in addition to the absorption zone). HSAS thus accumulate in the depleted absorption solution. The recovered $CO_2$, can be compressed and then either utilized in a conversion process, sequestered, or sent to a pipeline for use at another location.

It should be noted that the particular method and apparatus that are used for performing absorption of the acid gases and regeneration of the absorption solution via desorption of the acid gases are not critical to the present invention and are described herein through examples illustrating formation of the HSAS. For example, the absorber could include one or more stages and could include a packed column, bubble column, tray column, or another direct-contact gas-liquid vessel, and the desorption stripper could include one or more separation drum or column.

It is also noted that, although the acid gas that is exemplified herein in relation to the Figures is being referred to as $CO_2$, the feed gas can include other acid gases and be a gas mixture such that the acid gases can further include $SO_2$, $H_2S$, or a combination thereof, for example. More particularly, typical feed gases that can be treated in a regenerable amine-based absorption process as described above and as exemplified in FIG. 1 include acid gases such as $CO_2$, $H_2S$, $SO_2$, or any mixtures thereof.

In accordance with the nature of the acid gases that are present in the feed gas, the proposed amine-based acid gas recovery process can include at least one sequence of three consecutive stages including an acid gas recovery stage via a dedicated amine, an amine reclamation stage and a waste concentration stage. A concentrated waste stream is thereby produced and subjected to oxidizing which can reduce or even eliminate a liquid content of a resulting discharge stream. In some implementations, the proposed amine-based acid gas recovery process can be further tailored so as to fully recycle the oxidized waste stream such that the process can be a zero-waste process.

Further details regarding each step/stage are provided herein.

Combustion Step

The present reclamation techniques can be implemented in the context of a post-combustion acid gas recovery process 200, where the feed gas comprises a flue/combustion gas resulting from an upstream combustion stage.

For example, referring to FIG. 2, the feed gas 2 can be a combustion gas that results from an upstream combustion stage 11. When carbon dioxide is present in the combustion gas, its concentration typically ranges from about 2 to 30 volume percent, although levels of carbon dioxide as high as about 90 volume percent or more are not uncommon. When sulfur oxides are present in the combustion gas, i.e., sulfur dioxide and/or sulfur trioxide, their total concentration typically ranges from about 500 ppmv to 50 vol %, although levels as high as 70 vol % or more are possible. The combustion gas that is used as the feed gas can also comprise other ingredients such as, for example nitrogen, water, oxygen, light hydrocarbons, and sulfur derivatives of light hydrocarbons, e.g., mercaptans.

More particularly, referring to FIG. 2, the combustion stage is performed to produce the combustion gas 18 that can result from the combustion of a fuel 16, such as natural gas, LPG, Coke, Coal or any other material that is to be combusted to form $CO_2$, in a combustion zone 11 being for example gas turbines, boilers, furnaces, or any readily available combustion unit or system.

In accordance with the nature of the acid gases that are present in the combustion gas, the amine-based acid gas recovery process 200 can include at least one sequence of three consecutive stages including an acid gas recovery stage 210 via a dedicated amine, an amine reclamation stage 220 and a waste concentration stage 230, as described in further details herein.

Conditioning of the Feed Gas Prior to Carbon Capture

In some implementations, the post-combustion acid gas recovery process 200 can include removing acid gases that are stronger than $CO_2$ before proceeding to $CO_2$ absorption in the $CO_2$ recovery stage with a dedicated amine.

Depending on the composition of the combustion gas, various pre-treatment steps can be performed prior to proceeding with $CO_2$ recovery. For example, the combustion gas can be quenched and/or pretreated in a pre-scrubber, being generally a water-based wash, to remove solid contaminants (including acids). Other pretreatment units or systems that are configured to pretreat the combustion gas before absorption can include, for example and without being limited to, a filter, a venturi, a cyclone, or any combinations thereof.

For example, as seen in FIG. 2, the combustion gas 18 can be first pre-scrubbed to produce the feed gas 2 that is supplied to the acid gas recovery stage 210 that is dedicated to carbon capture. This pre-treatment can be particularly suited when stronger acids, such as $SO_2$ and, to a lesser degree $SO_3$, are present in the combustion gas 18 and result from the combustion of sulphur species. When $SO_2$ and/or $SO_3$ is present, these latter two species can be captured, for the most part, in a water-based pre-scrubber 12 that is located upstream of the absorption zone of the acid gas recovery stage 210.

Figure 3:
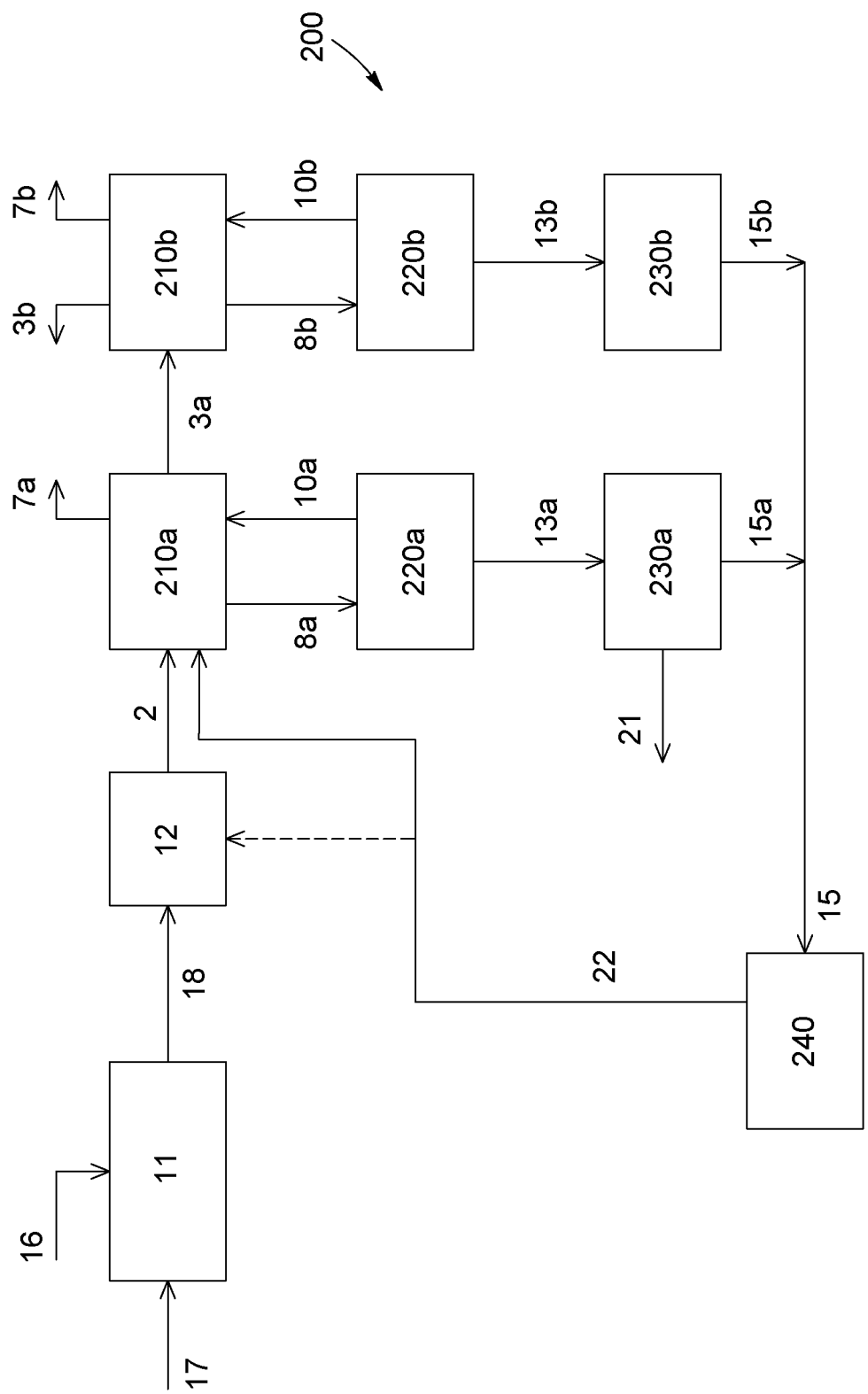
FIG. 3 illustrates a process flow diagram including integration of an acid gas production operation via combustion, an amine-based acid gas recovery operation including multiple acid gas recovery stages whereby heat stable amine salts are produced, corresponding amine reclamation stages comprising recovery of the heat stable amine salts and waste treatment including waste concentration stage and oxidizing stage for reduction and even destruction of the waste.

In another example, referring to FIG. 3, the pre-scrubber 12 can be supplemented with an additional acid gas recovery stage 210a that is configured to capture a remaining amount of acid gases (being stronger than $CO_2$), such as $SO_2$, with a first amine. This first strong acid gas recovery stage 210a is performed prior to the $CO_2$ recovery stage 210b involving the use of another and second amine. For each acid gas recovery stage 210a and 210b, corresponding subsequent amine reclamation stages 220a and 220b, and waste concentration stages 230a and 230b are operated in parallel. The process illustrated in FIG. 3 can be particularly suited when the $SO_2$ concentration of the scrubbed gas is over about 50 ppm to 1,000 ppm, and thus require an additional and dedicated amine-based $SO_2$ recovery stage.

In other implementations, the post-combustion acid gas recovery process 200 can include supplying the combustion gas directly to the first acid gas recovery stage 210 without any other pretreatment to be used as the feed gas 2 to the absorber 1 of the acid gas recovery stage 210 as seen in FIG. 1.

Acid Gas Recovery

As exemplified in FIG. 3, it is noted that the post-combustion acid gas recovery process 200 can thus include multiple acid gas recovery stages in series to capture the various acid gases of the combustion gas stream based on different amines that are chosen in accordance with the strength of the acid gas.

HSAS are amines in salt form having heat stable anions associated therewith, which are formed during acid gas recovery. It is known that the HSAS that are generated during $CO_2$ recovery 210 in an amine-based system can be derived from organic acids produced from the reaction of $CO_2$, CO, nitrogen and oxygen, and including for example acetic acid, formic acid, nitric or nitrous acid. If sulphur is present in the feed to the combustion step 11, other acids such as sulphurous, sulphuric, and thiocyanuric acids can be formed.

More specifically, during the amine-based carbon dioxide recovery 210, typically between 0.01% and 1% (on a molar basis) of the absorbed acid gas (or equivalent of this amount) can react with oxygen or degenerate or otherwise react with the amine (via a neutralization reaction) to be converted to a heat stable amine salt (i.e., stronger acids). For example, $CO_2$ can react with water to form acetic acid which provides the heat stable acetate anion. In another example, CO can under the right conditions react with water to form formic acid which provides the heat stable formate anion. Other sources of HSAS can be impurities found in the feed gas stream, impurities found in the make-up water stream or HSAS deriving from the degradation of the amine, most often due to reactions with oxygen.

The depleted absorption solution thus becomes contaminated with HSAS that accumulate in solution when the depleted absorption solution is recycled to the amine absorption unit. The depleted absorption solution exiting the desorption unit can be referred to as a contaminated amine absorption solution. Too high a concentration can result in corrosion issues, filtration issues and also loss of capacity. The absorption or carrying capacity of the amine-based absorption solution is substantially directly inversely proportional to the heat stable amine salt concentration. For example, it is possible for the heat stable amine salt to completely neutralize the amine and thus reduce its absorption capacity to zero.

The total concentration of HSAS in the depleted absorption solution, when contaminated, is typically from about 0.1 wt % to about 25 wt % based on the total weight of the solution. For example, the concentration of heat stable amine salts in the depleted absorption solution deriving from hydrogen sulfide and carbon dioxide acid gas absorption processes can be from about 1 wt % to about 5 wt %. In another example, the concentration of heat stable amine salts in the depleted absorption solution deriving from sulfur dioxide acid gas absorption processes can be from about 1 wt % to about 15 wt %. The concentration of the amine in free base form in the depleted absorption solution can be from about 5 wt % to about 60 wt %, optionally from about 20 wt % to 50 wt %. The concentration of water typically substantially corresponds to the balance of the depleted absorption solution and can optionally be, from about 30 wt % to about 95 wt %, and, further optionally from about 40 wt % to about 70 wt %, based on the total weight of the solution. In some implementations, the depleted absorption solution can include small amounts, e.g., less than about 2 wt %, of other ingredients such as, for example, neutralizing, antifoam and/or antioxidant agents.

Amine Reclamation

A portion of the depleted absorption solution or a portion of the enriched absorption solution produced during the at least one acid recovery stage 210 can thus be supplied to a corresponding amine reclamation stage 220 including an amine reclamation unit to remove the accumulating HSAS and to maintain the HSAS concentration in the lean amine absorption solution at a desired or optimum concentration, for example between 0 wt % and 3 wt % based on a total weight of the solution. Operation of the amine reclamation unit can be performed continuously or when a monitored concentration of HSAS in the depleted absorption solution or in the enriched absorption solution reaches a given threshold.

More particularly, referring to FIG. 1, in order to avoid accumulation of the formed HSAS and maintain the absorption capacity of the depleted absorption solution, a slipstream is taken via line 8 from the depleted absorption solution flowing in line 5, and the slipstream is introduced into an amine reclamation unit 9 to produce a regenerated amine stream and a waste stream. It is noted that supplying a slipstream to the amine reclamation unit 9 can be performed in a continuous, semi-continuous or batch mode.

In the particular implementation shown in FIG. 3, when multiple acid gas recovery stages (e.g. 210a for residual $SO_2$, and 210b for $CO_2$) are implemented in series, corresponding amine reclamation stages (220a, 220b) can be operated in parallel, each being fed with a slipstream (8a, 8b) from the corresponding acid gas recovery stage (210a, 210b) for removal of the accumulating HSAS.

Referring to FIG. 2, the pre-scrubber 12 can typically absorb (limited by chemical equilibrium) many of the same species (mostly acids) that the amine reclamation unit 9 will remove from the slipstream 8 of the depleted absorption solution generated in the acid gas recovery. Thus, in some implementations, when a pre-scrubber is present upstream of the acid gas recovery installation, at least a portion 20 of a bleed stream from the pre-scrubber 12 can also be fed to the amine reclamation unit 9.

Referring to FIGS. 1 and 2, the regenerated amine stream is at least partially depleted in HSAS and is returned to the amine-based acid gas recovery stage 210 process via line 10 to form a lean amine absorption solution. Referring to FIG. 2, a waste stream 13 is further produced, and contains acids and any other contaminants that are recovered from the depleted absorption solution in the amine reclamation unit 9, and any neutralizing agent if one is utilized.

The amine reclamation unit 9 can be an electrodialysis unit and can be operated according to the process implementations as described in U.S. Pat. No. 6,517,700 (which content is being incorporated herein by reference) or in international patent application No. PCT/CA2022/050772 (which content is being incorporated herein by reference) for removing the acids responsible for forming heat stable salts. The amine reclamation unit can be operated continuously on site or brought in from time to time on a need be basis.

Figure 4:
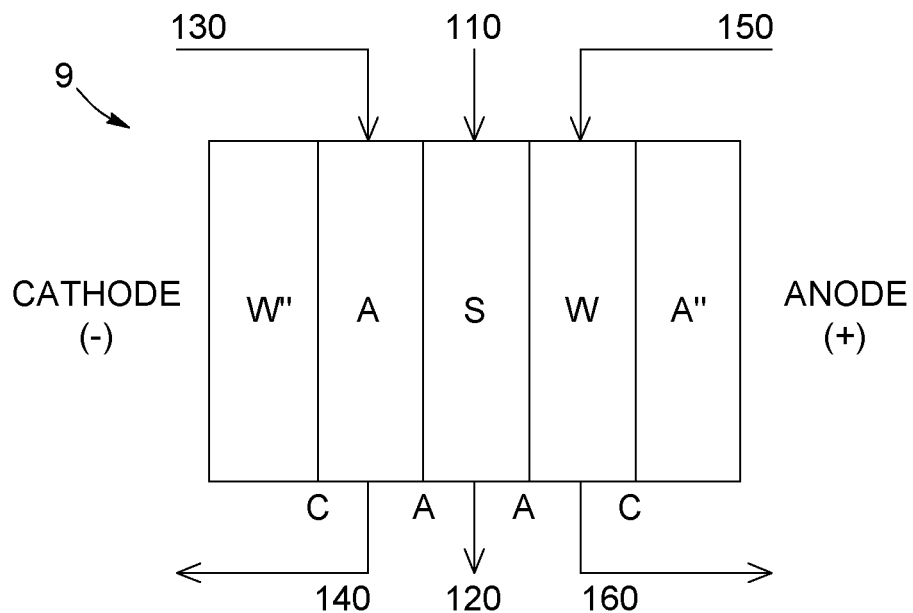
FIG. 4 illustrates a process flow diagram of an electrodialysis unit comprising three repeat units wherein a heat stable amine salt is converted into free base amine and a non-amine salt.

For example, referring to FIG. 4, the electrodialysis unit can be an electrodialysis zone 9 comprising a cathode compartment, an anode compartment and at least one repeat unit, wherein each repeat unit contains an anion source compartment (A), an amine solution compartment (S) and a waste compartment (W). Also illustrated in electrodialysis zone 9 are the anion source compartment (A") and the waste compartment (W") from adjacent repeat units. The anion source compartment (A) and the amine solution compartment (S) are separated by an anion selective membrane. The amine solution compartment (S) and the waste compartment (W) are separated by an anion selective membrane. The waste compartment (W") of an adjacent repeat unit and the anion source compartment (A) are separated by a cationic selective membrane. A direct current potential is passed transversely across each compartment in electrodialysis zone. The slipstream of the contaminated depleted absorption solution (containing heat stable amine salts) is fed as the feed stream to each amine solvent compartment via line 110 and returned to the acid gas absorption process via line 120 which will feed into line 10 directly or via an intermediate storage tank (not illustrated). Alternatively, the passing of the feed stream could be operated continuously, in a batch mode (periodically) or on a once through basis. A base or a source of regenerable anions (referred to as the anion source, or anion source solution) is circulated through the electrodialysis zone via lines 130 and 140. The anion source can be fed to the anion source department to provide anions passing into the product feed compartment (S) via the anionic selective membrane, and thereby providing cations in the adjacent waste compartment (W") via the cationic selective membrane and producing waste. If an acid that is a source of regenerable anions is fed to the anion source compartment, then an acid waste will be produced in the waste compartment instead of a salt solution. Thus, a salt or acid waste solution is circulated in the electrodialysis zone 9 via lines 150 and 160. Both the anion source solution and waste solution can be circulated on a once through basis, recirculated continuously or recirculated in a batch mode (periodically). The waste stream containing salts of heat stable anions such as sodium chloride is discharged from waste compartment (W) via line 160. It should be noted that, when the waste steam (and optionally the bleed stream of the pre-scrubber) is neutralized with a cation, such as sodium, the neutralizing agent ends up in the ash generated during combustion of the waste stream during the oxidizing stage.

Figure 5:
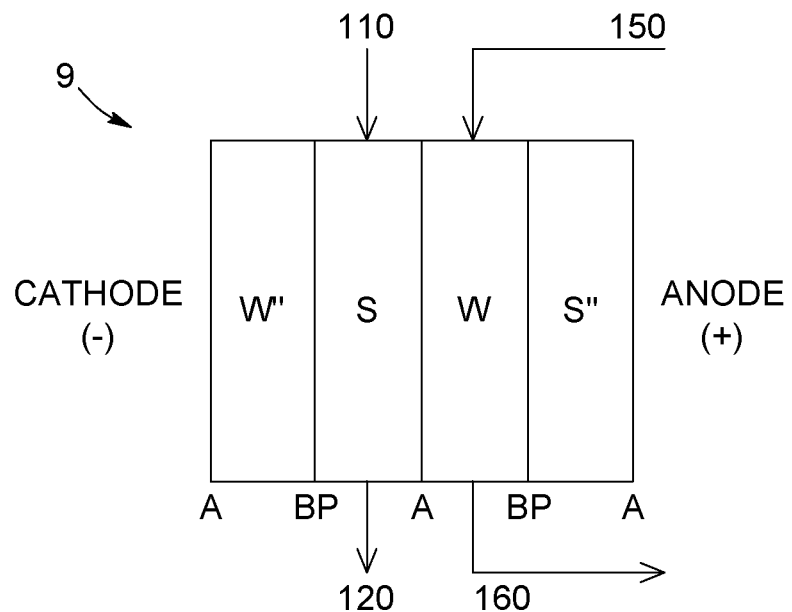
FIG. 5 illustrates a second variation of the flow diagram of an electrodialysis unit comprising three repeat units wherein a heat stable amine salt is converted into free base amine and a non-amine acid.

In another example, referring to FIG. 5, the electrodialysis unit can be an electrodialysis zone 9 comprising a cathode compartment, an anode compartment and at least one repeat unit, wherein each repeat unit contains an amine solution compartment (S), and a waste compartment (w). Also illustrated in the electrodialysis zone 9 are adjacent amine solution compartment (AS) and adjacent waste compartment (W") from adjacent repeat units. The electrodialysis zone 9 further contains bipolar membranes (BP) and anionic selective membranes (A). A direct current potential is passed transversely across each compartment in the electrodialysis zone 9. The slipstream of the contaminated amine solution (depleted absorption solution or enriched absorption solution) is fed to the amine solution compartment (S) via line 110 to form a product stream that is returned to the acid gas absorption stage via line 120. Both the feed and product streams can be recirculated through a tank with make-up and bleed being lines 8 and 10 respectively in FIG. 1. Alternatively, the process could be operated in a batch mode or on a once through basis. In the amine solution compartment (S), amine cations dissociate from the heat stable anions, such as chloride. The heat stable anions, such as chloride permeate through the anionic selective membrane to the waste compartment (W). Hydroxide anions are generated in the bipolar membranes and permeate into the amine solution compartment (S). In the amine solution compartment (S), the hydroxide anions combine with the protonated amine cations to form free base amine and water. Protons are also generated in the bipolar membranes and permeate into the waste compartment (W). An aqueous stream is introduced into the waste compartment (W). The regenerated amine stream containing some amine in free base form in addition possibly with some heat stable amine salts, or at least a reduced concentration of heat stable and heat regenerable anions is discharged from the amine solution compartment via line 120. A waste product stream containing acids of heat stable anions such as hydrochloric acid is discharged from waste compartment (W) via line 160. The waste stream can thus be generated without including any neutralizing agent/chemical, which can be particularly suited for recycling to combustion of non-ash generating fuels (such as natural gas).

The regenerated amine stream, having substantially the same composition as the slipstream except for a reduced concentration of heat stable salts, is discharged from the amine solution compartment. The regenerated amine stream comprises the amine in a free base form or in a non-heat stable salt form (when a regenerable anion being fed to the anion source loop), which may contain the amine(s) with heat stable and non-heat stable salts. Such regenerated amine stream can be combined with the depleted absorption solution 5 or with the enriched absorption solution 4 via line 10 as seen in FIG. 1.

Thus, the waste stream comprises the salt or acid of the heat stable anion of the HSAS. Typical salts of the heat stable anions can include, for example, alkali metal sulphates, alkali metal halides, alkali metal acetates, alkali metal thiocyanates, alkali metal thiosulphates, alkali metal nitrates and nitrites, alkaline earth sulphates, alkaline earth halides, alkaline earth acetates, alkaline earth thiocyanates, alkaline earth thiosulfates, alkaline earth nitrates and nitrites and mixtures thereof. Preferred salts of heat stable anions include sodium sulphate, sodium chloride, sodium acetate, sodium thiocyanate, and sodium thiosulphate. A carrier stream, for example an aqueous carrier, can be introduced to the waste compartment in order to control at least one of the flow rate, the concentration of the salt or acid, or the water content in the waste stream.

Typically, the quantity of HSAS that can be removed from an amine-based acid gas recovery facility 210 is less than 1%, for example less than 0.1%, of a total amount of acid gas being recovered. The waste stream associated with the downstream amine reclamation stage 220 can thus be considered as relatively small when compared to the overall acid gas 3 recovered via the acid gas recovery stage 210. The proposed reclamation process can eliminate the need for a supplemental wastewater treatment system or hazardous waste disposal as encountered in conventional solutions because the proposed reclamation process does not generate any liquid discharge or even any waste, being aqueous or not.

The amine reclamation process as exemplified in FIG. 2 can include removing at least a portion of HSAS from the depleted absorption solution recovered as a slipstream from the acid gas recovery process in an amine reclamation unit 9. For example, the process can include removing sufficient HSAS from the slipstream to maintain the HSAS concentration in the lean amine absorption solution between 0 wt % and 3 wt % based on a total weight of the solution. This acceptable HSAS concentration range can vary depending on parameters including amine type and amine concentration. For example, concentrations of HSAS in the lean amine absorption solution higher than 3 wt % can be desirable in specific situations.

Waste Treatment

The amine reclamation process further includes recycling and oxidizing (e.g., by incinerating) the waste stream back into its constituents to generate additional product (for example $CO_2$) and reduce the waste from the reclamation process to effectively net zero.

According to the present techniques, the waste stream/material that is produced by the amine reclamation stage 210 can be supplied to a waste treatment operation including a waste concentration stage 230 and an oxidizing stage 240. The oxidizing stage 240 can be operated in the existing combustion unit 11 as seen in FIG. 2, or can be operated as an additional downstream step 240 as seen in FIG. 3. In both cases, the product of oxidation can be supplied along or as part of the feed gas to the post-combustion acid gas recovery process 200 (e.g., to the pre-scrubber 12 and/or to the acid gas absorber of the acid gas recovery installation 210).

The present post-combustion acid gas recovery process 200, contrary to conventional solutions, can include recycling and oxidizing the generated waste stream into components that are treatable by the amine absorption process.

For example, in the implementation shown in FIG. 2, the process can include incinerating the generated waste stream in the existing upstream combustion step 11 of the acid gas generation stage, where the waste stream is combusted along with air and fuel to produce the feed gas 2 supplied to the pre-scrubber 12. For sites that do not have wastewater treatment units and or the waste stream would have to be shipped offsite to an appropriate waste treatment site. The capacity to recycle, combust and thus generate net-zero waste represent a significant operating and cost advantage.

In some other implementations, the amine reclamation process can alternatively include supplying the waste stream to a wastewater treatment system where all the dissolved carbon and nitrogen-based acids are slowly oxidized by contact with an oxidation agent resulting in no net waste, other than excess water, which could after proper treatment be recycled and re-used. For example, the oxidation agent can be air, peroxide or bleach.

In yet other implementations, as seen in FIG. 3, the waste stream can be sent via line 15 to a dedicated burner to operate the oxidizing stage 240 whereby acid gases can be produced and recycled back to the pre-scrubber 12 and/or the at least one acid gas recovery stage 210 via line 22.

Prior to oxidation, the waste treatment operation can optionally include removing at least a portion of the water from the waste stream to produce a concentrated waste stream having a further reduced volume with respect to the waste stream, and that is sent to oxidation via integrated combustion or another oxidation process.

In certain reclamation conditions, when using ion exchange or electrodialysis as the amine reclamation technique to remove HSAS from the contaminated amine solution, the generated waste stream can be too dilute and the volume of the waste stream can be impractical for oxidation. Typically, the concentration of dissolved salts and/or acids of the heat stable anions in the waste stream from an amine reclamation unit can be 2% or lower. In addition, when relying on ion exchange, large quantities of wash water (equivalent or higher than the volume of waste) containing small or residual concentrations of HSAS, neutralizing chemicals (for example NaOH) and some amine can be generated.

Thus, when the waste stream is too dilute, the present reclamation process can include concentrating the waste stream in at least one concentration unit that is operated according to methods readily available in the art, such as softening, evaporation, distillation, reverse osmosis, electrodialysis, or a combination thereof. It is noted that the step of concentrating and the concentration unit involve the operation of any method/equipment that is adapted to perform an increase in the concentration of acid and/or salt by way of a reduction of the amount of water or by another way. For example, referring to FIG. 2, the waste stream 13 can be first sent to a concentration step 14 where, for example, at least a portion of any excess water is removed to increase the acid and/or salt concentration. For example, referring to FIG. 3, the waste treatment can include performing waste concentration in dedicated stages 230a and 230b receiving respectively the waste stream from amine reclamation stages 220a and 220b via line 13a and 13b. The produced concentrated waste streams can be gathered via lines 15a and 15b to line 15 guiding to the oxidizing stage 240. It is noted that, differently from the set up illustrated in FIG. 3, the waste streams from lines 13a and 13b could be supplied to a common waste concentration stage to generate a total concentrated waste stream that is fed to the oxidizing stage 240.

It is further noted that the water removal/concentration step can be optional and depend on the aqueous nature of the waste stream and the amount of the excess water. Excess water is to be understood as the amount of water that is unnecessary or inadequate in accordance with a capacity of the subsequent oxidation step. The water removal step can be performed to produce a concentrated waste stream having a dissolved salt and/or acid concentration of at least 2 wt %, at least 5 wt %, at least 10 wt %, at least 15 wt %, at least 20 wt %, at least 30 wt %, at least 40 wt %, or at least 50 wt % of a total weight of the waste stream.

It should be noted that the level of concentration that is achieved during the waste concentration step can be adapted to a given total volume of water or a given total volume of concentrated waste stream that can be treated/accepted by the oxidation step (e.g., combustion). It should be further noted that the waste concentration step can be performed to reach a dissolved salt and/or acid concentration allowing to remain within the solubility limit of each of the salt and/or acid.

Referring to the example implementation of FIG. 2 where a pre-scrubber is present, another portion 19 of the bleed stream from the pre-scrubber 12 can be directly sent to the waste concentration step 14 where the portion 19 of the bleed stream can be concentrated and then fed via stream 15 back to the combustion unit 11 where the waste is destroyed yielding an overall net zero waste process. Water recovered from the waste concentration step 14 can then be recycled to the pre-scrubber 12 via stream 21 (or to any other system needing water in the plant). By recycling the recovered water 21 back to the feed gas conditioning step, e.g. in the pre-scrubber 12, not only has net zero water generation been achieved, but water consumption has been reduced significantly, achieving almost net zero water consumption.

It is noted that the recovered water can be recycled to any other water-consuming units of the operation or another operation. For example, the water can be used as boiler feed water to generate steam.

In some implementations, in addition to or instead of performing removal of at least a portion of the water of the waste stream, the technique for operating amine reclamation of the depleted absorption solution into a regenerated amine solution can be selected to minimize the amount of waste volume and/or minimize the amount of water included in the waste. For example, electrodialysis does offer the advantage of producing a more concentrated waste stream and being capable of producing a waste stream with no associated cation. Electrodialysis can be operated in a manner as to maximize the concentration of impurities and minimize water content.

For example, referring to FIGS. 4 and 5, the amount of aqueous carrier that is introduced into the waste compartment (W) can be controlled to minimize the water content of the waste stream, preferably less than 90% and ideally less than 80% or less. Thus, the reclamation step can in many instances be operated in such a manner as to generate a waste stream of sufficiently high concentration as to eliminate the need for the waste concentration step (14) and solely rely on controlled operation of the amine reclamation unit (9).

It should be noted that the concentration values are provided as examples and contemplated concentrations can depart from these exemplified values. The salt and/or acid concentration in the waste stream should be understood as being only limited by solubility limits of the contained species, and further economic considerations regarding the net impact of introducing water to the combustion step (versus the cost of further concentrating the waste stream). Net water consumption can be kept sufficiently low to make combustion of the waste stream possible and practical. Thus, by using electrodialysis for the amine reclamation stage, the waste stream can be generated without cations that are non-combustible and with sufficiently low water content as to make 1) oxidation (e.g., via combustion) possible and 2) to generate a net zero waste. The ability of the electrodialysis process to independently control and set the water content and salt/acid concentration of the waste stream, if operated according to the presently described implementations, is a significant advantage and thus allows for the waste stream to be destroyed/consumed via oxidation.

Control of the water content of the waste stream and/or concentrated waste stream can thus be performed in various ways in order to avoid sending an excessive amount of water to the oxidizing step, such as combustion.

Still referring to FIG. 2, the concentrated waste stream 15 is then returned to the combustion zone 11 for combustion thereof and to produce the combustion gas 18. Upon combustion, the waste dissolved salts and acids contained in the concentrated waste stream are converted to $CO_2$, nitrogen, or oxides of nitrogen. If sulphur is present in the fuel being combusted then some $SO_2$ with some associated $SO_3$ might also be recycled. If neutralizing cations are present in the waste stream, the stronger acids will form salts that will precipitate after combustion and be recovered in the combustion ash. By relying on an electrodialysis process for amine reclamation, a cation free waste stream can be generated leading to a true net-zero waste process.

As already described, non-organic acids such as sulphur can be captured in the pre-scrubber section or in a separate scrubber (which could be regenerable) that would capture $SO_2$. For those gas streams that contain sulphur the sulphur compounds that are recycled to the combustion step will be converted back into oxides of sulphur and then recovered in a pre-scrubber or water quench step located between the combustion process and the acid gas absorber. For gas streams that do not contain any sulphur, and thus no sulphur-based acids that form heat stable salts, the organic acids will be destroyed during the combustion process, resulting in a net zero waste generation from the reclamation process.

In some implementations, as seen in FIG. 3, when $SO_2$ is present in the combustion gas and because $SO_2$ is a much stronger acid than $CO_2$ or $H_2S$, the acid gas recovery can include recovering $SO_2$ in a separate first recovery stage 210a which is installed in series and upstream of the acid gas recovery stage 210b for recovering $CO_2$, thereby producing a feed gas being depleted in $SO_2$. The $SO_2$-depleted feed gas is then fed to the amine absorption tower of the second acid gas recovery stage 210b where it is contacted with the recirculating amine to recover $CO_2$. In processes in which the combustion of the fuel 16 is done partially under reducing conditions, or in other non-combustion acid gas generating processes such as in natural gas treating, refining processing, or ammonia production, $H_2S$ might also be present in the generated acid gas stream. Any waste associated with the conditioning of the acid gas stream in the pre-scrubber and with the amine reclamation can be sent to an oxidizing stage, such as performed in a combustion unit, with a minimum water content as already described.

In some implementations, for example if the lean amine loading (typically of $CO_2$) of the depleted absorption solution is above a given threshold (for example over 1,000 ppm), the reclamation process can further include pre-treating the depleted absorption solution upstream of the amine reclamation unit 9 to remove the excess lean loading as described in U.S. Pat. No. 9,908,085 (which content is incorporated herein by reference).

Example Implementation

For example, a 1,000 tonne per day amine-based carbon capture facility from a coal fired or natural gas fired power generation plant and capturing 95% of the generated $CO_2$ would typically generate (at 0.1%) approximately 23 kgmoles per day of heat stable salts, i.e., acids such as acetic acid, present as amine acetate or other acids. Removing 23 kgmoles per day or approximately 1,350 kg of acetate (or other acids) in a 10% by weight solution would generate daily, 13,500 kg of waste to be incinerated or just over 9 kg per min. At 30% strength this would be 4,500 kg per day. The 23 kgmoles of acetate would generate after incineration 23 kgmoles of $CO_2$ or 1 tonne per day of additional $CO_2$ to be captured. No other waste would be generated and at 10% strength the process would consume 12,500 kg of water per day, less at higher concentrations. Thus, no acid or acid salts are sent to waste and the only product is $CO_2$. The water content would be evaporated, which could consume some energy and result in a slight overall reduction in overall energy efficiency. Most of this water could be recovered when the gas is cooled, and the water condenses or in the amine absorption tower if the temperature is lower than the feed gas. The recycled waste stream from the amine reclamation unit could easily be concentrated up to the solubility limit of the contained impurities if needed or advantageous.

It should be noted that the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only. Therefore, the descriptions, examples, methods and materials presented in the claims and the specification are not to be construed as limiting but rather as illustrative only.

In the following description, the term "about" means within an acceptable error range for the particular value as determined by one of ordinary skill in the art, which will depend in part on how the value is measured or determined, i.e. the limitations of the measurement system. It is commonly accepted that a 10% precision measure is acceptable and encompasses the term "about".

In the above description, an embodiment or implementation is an example of the invention. The various appearances of "one embodiment," "an embodiment", "some embodiments" or "some implementations" do not necessarily all refer to the same embodiments. Although various features of the invention may be described in the context of a single embodiment or implementation, the features/aspects may also be provided separately or in any suitable combination. Conversely, although the invention may be described herein in the context of separate embodiments/implementations for clarity, the invention may also be implemented in a single embodiment/implementation.

The invention claimed is:

1. A process for removing heat stable amine salts (HSAS) from a contaminated aqueous amine absorption solution containing amine in salt form generated during an amine-based acid gas recovery operation, the process comprising:
    removing at least a portion of the HSAS from the contaminated aqueous amine absorption solution in an amine reclamation unit, thereby producing:
    a waste stream containing dissolved salts and/or acids, and
    a regenerated amine absorption solution containing a reduced amount of the heat stable amine salts; and
    treating the waste stream comprising oxidizing the waste stream into an oxidized product stream comprising $CO_2$, water, and nitrogen.

2. The process of claim 1, wherein treating the waste stream further comprises adjusting a salt and/or acid concentration in the waste stream prior to oxidation thereof.

3. The process of claim 2, wherein the salt and/or acid concentration is of at least 2 wt %, at least 5 wt %, at least 10 wt %, at least 20 wt %, at least 30 wt %, at least 40 wt %, or at least 50 wt %.

4. The process of claim 2, wherein adjusting the salt and/or acid concentration in the waste stream comprises concentrating the waste stream by removing at least a portion of the water from the waste stream to produce a concentrated stream.

5. The process of claim 4, wherein concentrating the waste stream comprises evaporation, distillation, reverse osmosis, electrodialysis or any combinations thereof.

6. The process of claim 4, comprising redirecting the at least a portion of the water removed via concentrating back to the amine reclamation unit or any other unit of the amine-based acid gas recovery operation and of an acid gas production operation.

7. The process of claim 2, wherein adjusting the salt and/or acid concentration in the waste stream comprises controlling operation of the amine reclamation unit for a given salt and/or acid concentration of the produced waste stream.

8. The process of claim 1, wherein oxidizing the waste stream comprises subjecting the waste stream to combustion to generate the oxidized product stream.

9. The process of claim 8, wherein treating the waste stream further comprises recycling at least a portion of the oxidized product stream to the amine-based acid gas recovery operation.

10. The process of claim 1, comprising recovering acid gases including the $CO_2$ from the oxidized product stream by supplying the oxidized product stream to an absorption unit of the amine-based acid gas recovery operation, wherein the oxidized product stream is contacted with an aqueous amine absorption solution for absorption of the acid gases.

11. The process of claim 1, comprising, when the oxidized product stream further comprises $SO_2$ and/or $SO_3$, recovering acid gases from the oxidized product stream by:
    subjecting the oxidized product stream to gas conditioning in a scrubbing unit or a quenching unit, to remove $SO_2$ and/or $SO_3$, and produce a depleted oxidized product stream; and
    supplying the depleted oxidized product stream to at least one absorption unit of the amine-based acid gas recovery operation, wherein the depleted oxidized product stream is contacted with an aqueous amine absorption solution to recover at least $CO_2$.

12. The process of claim 11, comprising withdrawing a bleed stream from the gas conditioning step and supplying at least a portion of the bleed stream to the amine reclamation unit to participate in generating the waste stream.

13. The process of claim 1, wherein oxidizing the waste stream comprises supplying the waste stream to a wastewater treatment unit operating oxidation of the salts and/or acids via contact with an oxidation agent to produce the oxidized product stream.

14. The process of claim 1, wherein the contaminated aqueous amine absorption solution fed to the amine reclamation unit is a slipstream of a regenerated absorption solution produced during the amine-based acid gas recovery operation.

15. A system for removing heat stable amine salts from a contaminated aqueous amine absorption solution generated during amine-based recovery of an acid gas representing at least a portion of a flue gas produced by combusting fuel and an oxidant, the system comprising:
    an amine reclamation unit configured to receive a slipstream comprising the heat stable amine salts from a regeneration unit of the amine-based acid gas recovery and to produce:
        a reclaimed stream depleted in heat stable salts for supply to an absorption unit of the amine-based acid gas recovery, and
        a waste stream comprising dissolved salts and/or acids;
    a concentration unit configured to receive the waste stream and produce a concentrated waste stream having an increased dissolved salt and/or acid concentration with respect to the waste stream; and
    an oxidizing unit having an inlet in fluid communication with the concentration unit and configured to supply the concentrated waste stream to the oxidizing unit for oxidation thereof to produce an oxidized product stream.

16. The system of claim 15, further comprising an acid gas recovery assembly comprising the absorption unit for contacting the combustion gas with an absorption solution for absorbing the at least one acid gas and the desorption unit for producing the reclaimed stream depleted in heat stable salts.

17. The system of claim 15, further comprising at least one additional absorption unit, a scrubbing unit, a quenching unit or a combination thereof, being located upstream of the absorption unit to remove at least a portion of the acid gases other than $CO_2$ from the flue gas.

18. The system of claim 15, wherein the oxidizing unit is a combustion unit having the inlet in fluid communication with the concentration unit for receiving the concentrated waste stream.

19. The system of claim 18, wherein the combustion unit further has a fuel inlet configured to receive the fuel and an oxidant inlet configured to receive the oxidant, and the oxidized product stream is the flue gas that is directed to the amine-based acid gas recovery.

20. The system of claim 15, comprising a control unit being operatively connected to at least one of the amine reclamation unit and the concentration unit to control the water content of the waste stream and/or the concentration of dissolved salts/acids in the waste stream.

* * * * *